USO11658489B2

(12) United States Patent
 Botarelli et al.

(10) Patent No.: US 11,658,489 B2
(45) Date of Patent: May 23, 2023

(54) METHOD AND SYSTEM FOR FORMING, MANAGING, AND COORDINATING A NETWORK OF POWER GENERATORS

(71) Applicant: Marici Holdings The Netherlands B.V., Rotterdam (NL)

(72) Inventors: Andrea Botarelli, S. Mama (IT); Luigi Lamoglie, Terranuova Bracciolini (IT); Tiberio Bucci, Terranuova Bracciolini (IT); Alessandro Faggiani, Terranuova Bracciolini (IT); Cosimo Falaschi, Terranuova Bracciolini (IT)

(73) Assignee: Marici Holdings The Netherlands B.V., Rotterdam (NL)

( * ) Notice: Subject to any disclaimer, the term of this patent is extended or adjusted under 35 U.S.C. 154(b) by 345 days.

(21) Appl. No.: 16/871,381

(22) Filed: May 11, 2020

(65) Prior Publication Data
 US 2020/0366099 A1 Nov. 19, 2020

(30) Foreign Application Priority Data
 May 13, 2019 (EP) .................................... 19174016

(51) Int. Cl.
 *H02J 3/38* (2006.01)
 *G06F 16/23* (2019.01)
 (Continued)

(52) U.S. Cl.
 CPC .............. *H02J 3/381* (2013.01); *G05B 15/02* (2013.01); *G06F 16/2365* (2019.01); *H02J 13/00006* (2020.01); *H02J 2300/20* (2020.01)

(58) Field of Classification Search
 CPC .. H02J 3/381; H02J 13/00006; H02J 2300/20; H02J 3/48; H02J 3/472;
 (Continued)

(56) References Cited

U.S. PATENT DOCUMENTS

| 9,906,040 B2 * | 2/2018 | Aitzetmueller ..... H02J 13/0001 |
| 2005/0073783 A1 * | 4/2005 | Luo ........................ H02M 7/493 361/62 |

(Continued)

FOREIGN PATENT DOCUMENTS

EP 3076194 A1 10/2016

OTHER PUBLICATIONS

Arbab-Zavar et al: "Smart Inverters for Microgrid Applications: A Review" Department of Energy Technology, Aalborg University, Pontoppidanstraede 111, DK-9220 Aalboerg, Denmark, Published Mar. 4, 2019.

(Continued)

*Primary Examiner* — Mohammad Ali
*Assistant Examiner* — Dhruvkumar Patel
(74) *Attorney, Agent, or Firm* — Patterson Intellectual Property Law; Gary L. Montle (57) ABSTRACT

A method for managing an energy generation system is disclosed. The system includes a cluster of power generators connected by a connectivity network. Each power generator includes an inverter having a respective controller, and at least a data set available to the controller for controlling the respective power generator. Each inverter transmits through said connectivity network, to the other inverters of the cluster, information concerning said data set available to it, said information being sufficient to check whether the data sets available to each inverter are aligned. Each inverter receives, through said connectivity network, information concerning the data set available to other inverters of the cluster and checks whether the data set available to it is aligned with the data sets available to the other inverters of the cluster.

14 Claims, 6 Drawing Sheets

(51) Int. Cl.
*H02J 13/00* (2006.01)
*G05B 15/02* (2006.01)

(58) Field of Classification Search
CPC .......... H02J 13/00022; H02J 13/00026; G05B 15/02; G06F 16/2365; Y04S 40/126
See application file for complete search history.

(56) References Cited

U.S. PATENT DOCUMENTS

| | | | |
|---|---|---|---|
| 2014/0119080 A1* | 5/2014 | Sakamoto | H02M 7/493 363/95 |
| 2015/0084416 A1 | 3/2015 | Nishibayashi et al. | |
| 2016/0124400 A1* | 5/2016 | Kanayama | H02M 1/32 307/116 |
| 2018/0090988 A1* | 3/2018 | MacCleery | H02J 13/00017 |

OTHER PUBLICATIONS

International Serach Authority: European Patent Office Search Report for Application No. EP 19 17 4016 dated Jul. 17, 2019.

\* cited by examiner

METHOD AND SYSTEM FOR FORMING, MANAGING, AND COORDINATING A NETWORK OF POWER GENERATORS

CROSS-REFERENCES TO RELATED APPLICATIONS

This application claims benefit of European Patent Application No. 19174016, filed May 13, 2019, and which is hereby incorporated by reference.

FIELD OF THE INVENTION

The present disclosure relates to systems and methods for setting up and managing a network including a cluster of power generators and respective inverters.

BACKGROUND

The continuous increase in power demand poses serious pollution issues and raises concern on the environmental impact of power generation processes. This is particularly true when fossil fuels are used to generate thermal power, which is then converted into mechanical and electric power. Combustion of fossil fuels (either in solid, liquid or gaseous form) generates greenhouse gas (carbon dioxide), which is considered responsible for climate changes.

In an attempt to reduce the environmental impact of power generation, the use of renewable energy sources has been investigated, in particular solar and wind energy.

So-called DER (Distributed Energy Resources) systems have been developed, which include systems typically using renewable energy sources, including small hydro, biomass, biogas, solar, wind, and geothermal power sources. DER systems play an increasingly important role for the electric power distribution system. Often DER systems are grid-connected, i.e., they are connected to a large utility grid. Electric power generated by the power generators of renewable energy source systems is supplied to local loads connected to the system. Excess power available from the renewable energy source is delivered to the utility grid.

Plants with photovoltaic generators, as well as other renewable energy sources, such as wind turbines, shall satisfy several requirements regarding power control. Main applications include on-demand regulation of the power flow between the renewable energy source system and the utility grid, as well as grid stability control, e.g., active power derating or reactive power injection for compensating abnormal voltage/frequency conditions.

Multiple generators as well as other grid-connected devices like loads, transformers, storage batteries, are part of typical commercial and industrial plants. Typical control flow requires monitoring power signals at a point of common coupling (hereon shortly also "PCC") between the energy generating system and the utility grid. Based upon said power signals, specific actions are executed on the power generators of the renewable energy source system. This is usually implemented with closed-loop control using PCC signals as feedback for updating generator settings.

Moreover, current country standards are demanding for higher plant control performances like reaching control targets within a precise deadline to avoid power overflow on utility-side and/or grid faults.

Photovoltaic plants, as well as other energy generation systems, specifically those using renewable energy sources, can include a large number of power generators, each including an inverter, which converts the DC electric power, generated by the photovoltaic panels, for instance, into suitable AC current with required frequency and phase. The power generators can be connected to local loads and to the utility grid, to which power exceeding the one required to operate the loads is exported. Depending upon country standards applying in the specific country in which the system is installed, export limitations may apply, which prevent unlimited exportation of power in the utility grid. Export limitation, as well as other actions to be performed on the power generators of a system or cluster, may require data communication among apparatus connected to a connectivity network, for instance among inverters and/or among power meter(s) and inverters.

It would be beneficial to provide efficient methods and systems to set up, i.e., form, manage and coordinate an inverter cluster, for power generation and export control.

BRIEF SUMMARY

A new method for managing an energy generation system including a cluster of power generators connected by a connectivity network, is disclosed herein. Each power generator includes an inverter having a respective controller or regulator, i.e., a control unit adapted to control operation of the inverter. The control unit has at least one data set available for controlling the respective power generator. The data set may include data defining the configuration of the system. The data set may further include operating data of the devices of the system, for instance quasi-static data, as exemplified later on.

According to the method disclosed herein, each inverter transmits (e.g. through a connectivity network) to the other inverters of the cluster, information concerning the data set available to it. The shared information is suitable to check whether the data sets available to each inverter are aligned, i.e., if all inverters share the same data. For instance, if the data set include data setting forth the configuration of the system, the information shared among the inverters is sufficient for each inverter to check if each inverter has the same configuration loaded in it and available to the controller.

When the system is in operating condition, each inverter receives (e.g., through the connectivity network), information concerning the data set available to other inverters of the cluster. Each inverter checks if the data sets are aligned or not, i.e., if the inverters have the same data set available to the respective controller. Each inverter can, for instance, shift alternatively in an aligned state or in a misaligned state. The first state is taken if the data set is identical for all inverters, i.e., the data set is synchronized (aligned). The second state is taken if the alignment condition is not satisfied. According to the method disclosed herein, if the data sets are aligned, the inverter remains in an aligned state. Conversely, if the data sets are misaligned, the inverter shifts in a misaligned state and sends data through the connectivity network (8) to re-align the data sets, and shifts back in the aligned state once the data sets are realigned.

To save bandwidth, in preferred embodiments, the information shared by the inverters through the connectivity network includes a digest of at least a portion of the data set. The synchronized (aligned) condition can be checked by comparing digests of data sets shared among inverters. If the digests are identical to one another, the system is aligned. If they are not identical, the system is misaligned and a re-alignment procedure shall be initiated.

For instance, in the aligned state each inverter can perform the following steps: sends information on the data set thereof through the connectivity network to the other inverters of the cluster; receives information on the data set of at least another inverter of the cluster from said connectivity network (8); checks if the data set of the inverter and the data set of the other inverter are aligned.

Specifically, if the information includes or is represented by a digest of the data set, an inverter in the aligned state performs the following steps: calculates a first digest of the data set thereof and sends said first digest through the connectivity network to the other inverters of the cluster; receives through the connectivity network a second digest of the data set of at least another inverter of the cluster; checks if the first digest and the second are identical. Moreover, if the first digest and the second digest are identical the inverter remains in the aligned state. Conversely, if the first digest and the second digest are different from one another, the inverter shifts in the misaligned state.

In some embodiments, e.g., when the data set represent ort contains the data setting forth the configuration of the energy generation system, each inverter in the misaligned state can perform the following steps: shares with the other inverters of the cluster the first data set and the digest thereof, the first data set having a time stamp; when a second data set with a time stamp is received by the inverter in the misaligned state, the inverter checks which of the first data set and second data set has the most recent time stamp and elects said data set with the most recent time stamp as the data set of the inverter; repeats the above steps until the first data set and the second data set are identical to one another.

Further features and embodiments of the method according to the present disclosure are described below, reference being made to the attached drawings, and are set forth in the appended claim, which form an integral part of the present description.

BRIEF DESCRIPTION OF THE SEVERAL VIEWS OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

In the following description reference will be made to a photovoltaic plant, including photovoltaic panels and relevant inverters, forming a cluster of power generators connected to a local grid and to a connectivity network. It shall, however, be understood that at least some of the advantages disclosed herein can be achieved also when the method is implemented in a different energy generation system, for instance including different kinds of renewable energy sources, such as concentrated solar power plants, wind farms, wave energy collection plants, fuel cell systems, and the like. Also, advantageous implementations may include sources different than renewable energy sources.

More generally, methods and systems disclosed herein may be beneficial in combination with clusters of power generators, each provided with an inverter and a relevant regulator or controller, wherein the inverters of the several power generators of the cluster must be in data exchange relationship with one another and possibly with one or more power meters coupled to the electric grid.

Figure 1:
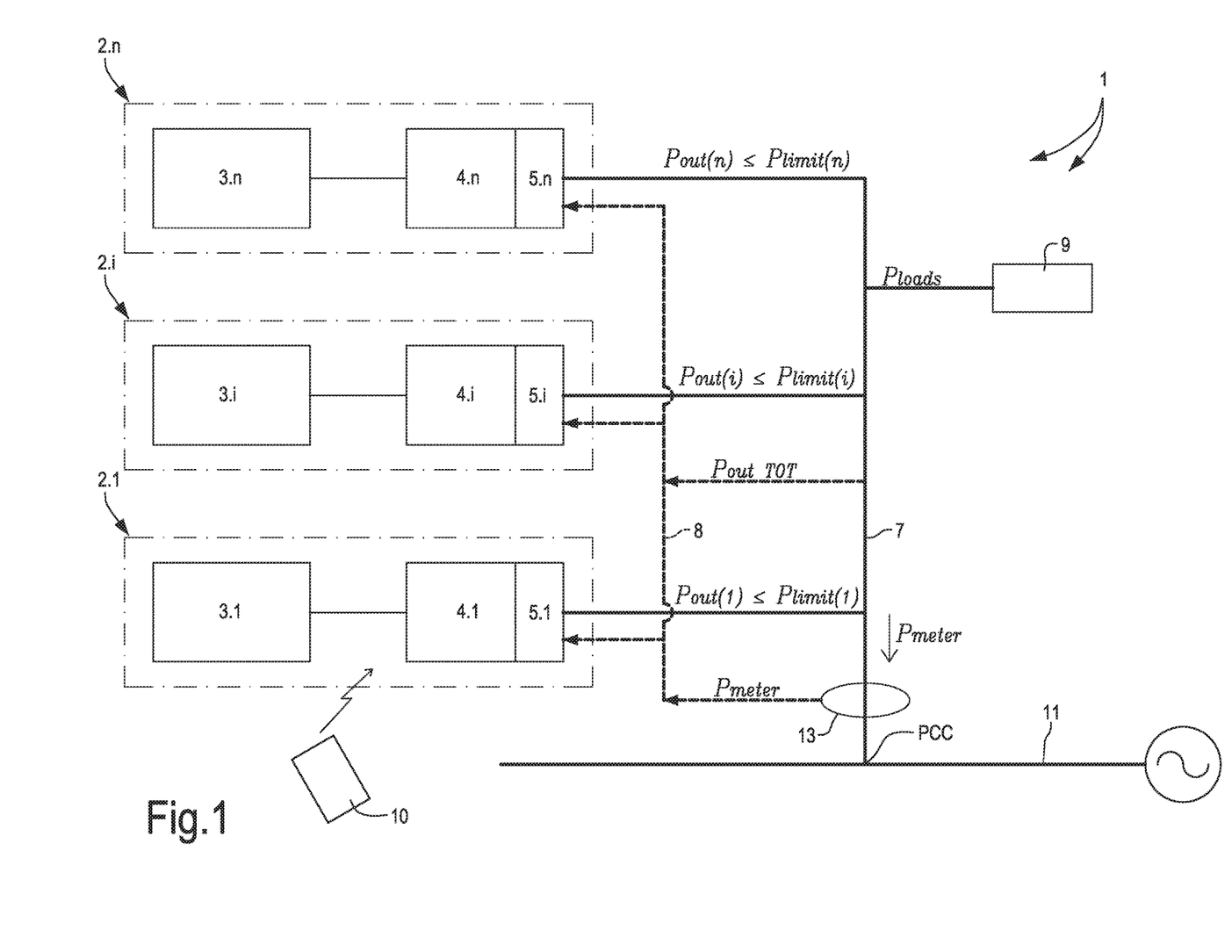
FIG. 1 illustrates an exemplary embodiment of a renewable energy source system using photovoltaic panels according to the present disclosure.

Turning now to the drawings, FIG. 1 illustrates a schematic of an exemplary energy generation plant or system 1 according to the present disclosure. In the embodiment of FIG. 1 the energy generation system 1 uses solar renewable energy. The energy generation system 1 comprises a plurality of n photovoltaic power generators $2.1, \ldots 2.i, \ldots 2.n$. The plurality of power generators will be referred to also as a cluster of power generators herein. In preferred embodiments, each photovoltaic power generator $2.1, \ldots 2.i, \ldots 2.n$ may include an array of photovoltaic panels $3.1, \ldots 3.i, \ldots 3.n$ and an inverter $4.1, \ldots 4.i, \ldots 4.n$. Each inverter $4.1, \ldots, 4.i, \ldots 4.n$ is provided with a regulator, i.e. a controller or control unit, labeled $5.1, \ldots 5.i, \ldots 5.n$. In embodiments disclosed herein the regulator is an embedded regulator. As used herein, the term embedded regulator designates a regulator or controller which forms part of the inverter, rather than an external device.

Each inverter collects DC electric power from the photovoltaic panels $3.1, \ldots 3.i, \ldots 3.n$ and converts it into AC electric power, which is then distributed on a local grid 7. Loads 9 can be electrically connected to the local grid 7. The local grid is connected to a utility grid 11 at a point of common coupling PCC.

In the embodiment of FIG. 1, the system 1 further includes one or more loads, cumulatively represented by block 9. Each power generator $2.1, \ldots 2.i, \ldots 2.n$ generates output power $P_{out(1)}, \ldots P_{out(i)}, \ldots P_{out(n)}$. A portion $P_{loads}$ of the generated power is supplied to the loads 9 coupled to the local grid 7, while remaining power $P_{meter}$ is exported to the utility grid 11. A power meter 13, also referred to as PCC meter, measures the power $P_{meter}$ exported to the utility grid 11 and provides a feedback signal, again labeled $P_{meter}$, which contains information on the exported power, to each power generator $2.1, \ldots 2.i, \ldots 2.n$.

A connectivity network 8 can be provided for data transmission between the power meter 13 and the power generators $2.1, \ldots 2.i, \ldots 2.n$. The connectivity network 8 can feature a multicast bus, for multicasting transmission of data among the several power generators in data exchange relationship with the connectivity network 8. Thus, the connectivity network 8 also allows transmission of data among power generators, for instance multicast data which each power generator publishes on the network for use by the other power generators, for purposes which will become clearer from the following description. More specifically, each inverter $4.1, \ldots 4.i, \ldots 4.n$ includes a data receiving and transmitting facility, to transmit data on the connectivity network 8 and receive data from the connectivity network 8.

In some embodiments, each regulator $5.1, \ldots 5.i, \ldots 5.n$ is adapted to provide control signals to regulate the output power $P_{out(1)}, \ldots P_{out(i)}, \ldots P_{out(n)}$ delivered by each power generator $2.1, \ldots 2.i, \ldots 2.n$. The feedback signal is provided to each one of said $P_{meter}$ regulators 5.1, . . . 5.i, . . . 5.n through the connectivity network 8 and each regulator generates a control signal for the relevant power generator 2.1, . . . 2.i, . . . 2.n, i.e. a signal controlling the operation of the relevant inerter 4.1, . . . 4.i, . . . 4.n.

Each regulator 5.1, . . . 5.i, . . . 5.n can be implemented as a hardware device, as a control software or as a hybrid hardware and software device, and can be embedded in or form part of the inverter of the relevant power generator 2.1, . . . 2.i, . . . 2.n.

Figure 2:
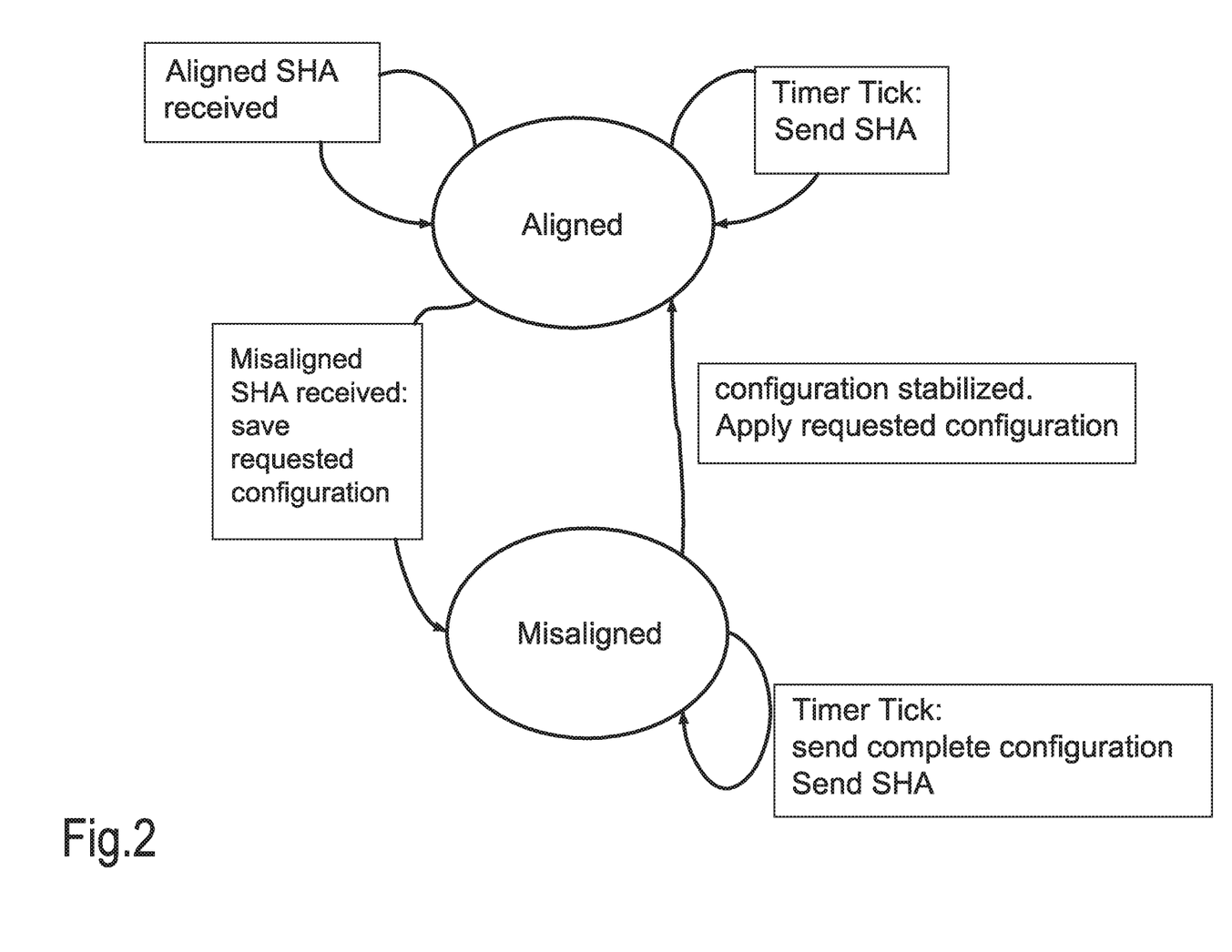
FIG. 2 illustrates a finite state machine supervising the re-alignment misalignment of configurations among power generators of a cluster.

Based upon the control signal provided by the respective regulator 5.1, . . . 5.i, . . . 5.n, the output power $P_{out(1)}$, . . . $P_{out(i)}$, . . . $P_{out(n)}$ of each generator 2.1, . . . 2.i, . . . 2.n is maintained under a respective limit threshold $P_{limit(1)}$, . . . $P_{limit(i)}$, . . . $P_{limit(n)}$, for instance. In the diagram of FIG. 2 $P_{outTOT}$ indicates the total power generated by the inverters 2.1, . . . 2.i, . . . 2.n. The regulators 5.1, . . . 5.i, . . . 5.n can be adapted to limit the power generated by each generator 2.1, . . . 2.i, . . . 2.n such that the total power output $P_{outTOT}$, minus the power $P_{loads}$ absorbed by the loads 9 is maintained under a target power exportation limit value $P_{PCC}$. Each regulator performs a control algorithm to provide a limitation signal for the relevant inverter based upon the total power output $P_{outTOT}$, and the active power $P_{meter}$ exported to the utility grid 11 at the point of common coupling PCC. The limitation signals of the inverters 4.1, . . . 4.i, . . . 4.n are aimed at maintaining the actual power $P_{meter}$ exported to the utility grid 11 under the target power exportation limit value $P_{PCC}$.

The inverters 4.1, . . . 4.2, . . . 4.n can be connected to one another using a daisy chain configuration or a star topology, for instance. Data exchange between power generators becomes thus possible, such that regulators or controllers 5.1, . . . 5.i, . . . 5.n of the power generators can receive data from the other power generators and relevant controllers for the purposes explained here on.

Each inverter has its own IP address and all IP addresses of the inverters forming an inverter cluster participate to a closed loop control process. The inverters of the cluster are on the same subnet of a local network. The power meter 13 can be any meter adapted to exchange information through the connectivity network 8 with the inverters 4.1, . . . , 4.i, . . . 4.n, i.e. with the control units 5.1, . . . 5.i, . . . 5.n thereof. For instance the power meter 13 can be an RS485 meter. In this case, the power meter will be connected to the network 8 using one of the inverters forming the cluster as a gateway. In other embodiments, the power meter can be a TCP power meter directly connected to the connectivity network 8.

The inverter cluster and other relevant apparatus connected to the connectivity network 8 shall be configured according to a system configuration. The configuration of system 1 includes a plurality of parameters and pieces of information, which are required for the power generators 2.1, . . . , 2.i, . . . 2.n to operate in combination with one another in a coordinated manner. The configuration thus consists in a data set, which can be made available to the inverters for instance in the form of a package of serialized data.

Each inverter 2.1 . . . , 2.i, . . . 2.n, i.e. the controller or regulator 5.1, . . . 5.i, . . . 5.n thereof, shall have sufficient information on the system configuration for it to properly control the respective power generator. The configuration of the system 1 can be uploaded in the various devices of the system. The configuration data become thus available to the control unit of each device connected to the connectivity network 8 of the system. Uploading of the configuration can be through an installer APP running on a portable apparatus, for instance. The portable apparatus can be any apparatus suitable for this purpose, e.g. a laptop, a tablet or a smartphone, schematically shown at 10 in FIG. 1.

In some embodiments, the configuration APP can allow the user to: set the nominal power of the plant or system 1; select the inverters forming part of the cluster, e.g., by selecting the relevant IP addresses; select one or more power meters providing measures on power flowing in specific points of the system, for instance and specifically the exported power, i.e., the power flowing through the point of common coupling PCC to the utility grid 11; power threshold data relating to export power control, for instance the percentage of the nominal plant power to export on the utility grid 11; a guard band percentage that will act as an additional restriction to the active power exported to the utility grid.

The system configuration can be modified and each configuration is characterized by a timestamp, for the purpose which will become clear from the following description.

Possible steps to load a configuration onto the control units of the inverters 4.1, . . . 4.i, . . . 4.n of the cluster will be described later on. The configuration needs to be shared by all inverters and each inverter shall share the same configuration, i.e., the configurations stored in the plurality of inverters forming the cluster of system 1 shall be aligned. According to the method disclosed herein, alignment of the configuration among all the inverters is based on a publish/subscribe pattern and upon multicast messages.

In fully operational condition each inverter periodically shares information on the configuration stored in it, for example in a memory accessible by the controller or regulator 5.1, . . . 5.i, . . . 5.n thereof. More specifically, each inverter will publish on the connectivity network 8 the information on the configuration stored therein. Sharing of this information can be through a multicast message on the connectivity network 8. Consequently, each inverter receives information on the configuration stored in each inverter of the cluster. It is thus possible to check if the same configuration is stored in each inverter, or else if a misalignment is present. As noted above, for correct operation of the system 1, all power generators 2.1, . . . 2.i, . . . 2.n shall share the same configuration.

In possible embodiments, the inverters may transmit by multicast a message or a set of messages containing the whole configuration data. However, in order to reduce the amount of data shared on the connectivity network 8 and thus to save bandwidth, in currently preferred embodiments each inverter will transmit to the other inverters a more compact message, for instance a digest, i.e., a hash, of the configuration stored in it. In some embodiments the SHA256 of the stored configuration can be calculated by each inverter and shared with the other inverters by multicasting transmission thereof on the connectivity network 8.

If all inverters have the same configuration stored therein, the SHA256, or any other suitable hash or digest thereof, will be identical for all inverters. Each inverter collects the digest received from the other inverters and checks whether the digests are all identical to one another. If at least one inverter has a misaligned configuration, i.e., a configuration differing from the configurations of the other inverters, this will result in an inconsistent digest, i.e., each inverter will receive at least one digest which is different from the others.

When an inverter detects a misalignment in the configuration of the inverters, i.e., an inconsistency between digests of the various configurations shared by multicasting on the connectivity network 8, the inverter will be placed in a misaligned state and will share the complete configuration thereof with all inverter for realignment. In other words, each inverter will publish on the connectivity network 8 the full configuration in an attempt to load it into the other inverters. It is sufficient for a misaligned state to arise if two digests of the configuration available to two inverters are different from one another. Thus, the realignment procedure can start as soon as one misaligned digest is received.

In order for the inverters to re-align, the configuration with the latest (i.e., most recent) timestamp will be considered the valid one by all inverters taking part to the re-alignment process. All the inverters will thus converge to the most recent configuration and load it into the storage memory thereof.

More specifically, in some embodiments, each inverter in the misaligned state, which receives a configuration from another inverter, will compare the configuration stored in it and the received configuration, will select the one of said configurations having the most recent timestamp and store it as the new, valid configuration. At the next iterative step (next timer tick), the inverter in the misaligned state will send the newly selected configuration to the other inverters, and the digest thereof. The result of this procedure will be converging of all inverters to the same configuration.

The re-alignment process described above will end once the configuration has been stable among all inverters for a preset amount of time (a pre-set of timer ticks), and it will be applied to all inverters which will then shift from the misaligned state to the aligned state again and become fully operational again.

FIG. 2 illustrates a finite state machine supervising the above described process. In the diagram of FIG. 2 the two states of the inverter are illustrated, namely aligned (all digests received are identical to one another), or misaligned (at least one digest received is different from the others). The inputs affecting the state of the inverters are also represented by relevant blocks in the diagram. When the inverter is in the misaligned state, it will publish the complete configuration and the digest (SHA) thereof as well, since checking the alignment condition is performed by comparing the configurations digests received by the inverters. As can be understood from the finite state machine illustrated in FIG. 2, the inverter remains in the aligned state as long as the digests (SHA) received are all identical to one another. Each inverter will send at every timer tick the digest of the configuration stored therein.

When misaligned SHAs are received, the inverter is shifted from the aligned to the misaligned state. At each timer tick the inverter will now send the complete configuration and the digest (SHA) thereof to the other inverters. The state of the inverter is shifted from misaligned to aligned again when the configuration is stabilized.

Configuration misalignment may occur for instance when a new inverter is added to the cluster, or when a dormant inverter is put into operation. A configuration misalignment also occurs when the user loads an updated configuration into one of the inverters, which then transmits the new configuration to the other inverters for configuration updating. In this latter case, for instance, the user will connect to a selected one of the inverters, for instance, and load a new (updated) configuration therein. The inverter in question calculates the digest of the new configuration and transmits the digest (e.g. the SHA256). All inverters are then placed in the misaligned state, since one of the digests received by all inverters is inconsistent with the others. Since the new configuration loaded on the inverter has the most recent time stamp, the above described procedure will cause all the inverters to converge to the new configuration, i.e., the new configuration will replace the old configuration in all inverters. The digest of the new configuration calculated by all inverters becomes now identical to one another and the inverters are shifted from the misaligned to the aligned state.

During operation the configuration of the entire system 1 can be detected by connecting to any one of the devices attached to the connectivity network, since the configuration is stored in each power generator 2.1, . . . 2.i, . . . 2.n. Data on the configuration become unavailable if the inverter is in the misaligned state, but become available again as soon as the device is switched back into the aligned state.

In operation, the system 1 is characterized by quasi-static data. Quasi-static data as used herein, may be understood as those data which satisfy the following rules: their rate of change is much slower than the characteristic period of the system, for instance 1 second; the data are needed for performing at least one task of the system, for instance for controlling the power export on the utility grid 11; and the data shall be synchronized in the whole system, i.e., each inverter of the system shall have the same values of the quasi-static data stored in it.

Examples of quasi-static data are: rated power of the inverter; inverter identification data; commissioning status; available and configured power meters in the cluster.

Each inverter may provide one or more quasi-static data. Each quasi-static datum is identified by a key and takes a value, which can be time-variable. Quasi-static data can be mapped in a map containing, for each quasi-static datum: an identification (for instance a univocal ID number) of the device providing the datum; the key of the datum, and the current value of the datum. The quasi-static data can be serialized in a sequence of bits for multicast transmission through the connectivity network 8 to each power generator 2.1, . . . 2.i, . . . 2.n of the system 1.

The set of quasi-static data shall be shared among all power generators 2.1, . . . 2.i, . . . 2.n and shall be synchronized, i.e., each controller of the power generators shall share the same set of data. In order to check whether the quasi-static data are synchronized, during operation each controller can transmit iteratively the serialized package containing the quasi-static data on the connectivity network 8 to all other controllers of the power generators. In preferred embodiments, to reduce the amount of data to be transmitted on the connectivity network and thus save bandwidth, a digest of the serialized quasi-static data is transmitted, rather than the serialized quasi-static data themselves. For instance the SHA256 of the serialized quasi-static data can be used.

Each controller of the power generators can check if the data are synchronized by simply comparing the received digests. If the digests of the serialized data packages are identical to one another, the data are synchronized and the controller remains in an aligned state.

If, for instance, a datum provided by one power generator changes, the resulting digest of the serialized data package will differ from the digest of the other data packages provided by the controllers of the other power generators. This will cause power generators to receive differing digests. This situation will switch the power generator from the aligned state to a misaligned state.

Re-synchronization of the system is performed in a similar manner as described for the synchronization of the configurations. A controller which is in a misaligned state will start transmitting through the network 8 the quasi-static data, such that a new serialized map of quasi-static data can be calculated by all the controllers and the digest thereof can be computed anew and transmitted by multicasting on the network 8. The process will finally converge towards a new stabilized set of quasi-static data.

In some embodiments, in order to save bandwidth, each controller which is placed in a misaligned state will transmit only the data it has ownership of. For instance, only the inverter data and the own monitored meter data are transmitted. Each inverter will thus receive quasi-static data from all inverters and will be able to re-aggregate the data to get the complete picture of the system. The digest of the re-aggregated data is calculated.

When a stabilized set of quasi-static data is achieved, the power generators are shifted back in the aligned state.

Figure 4:
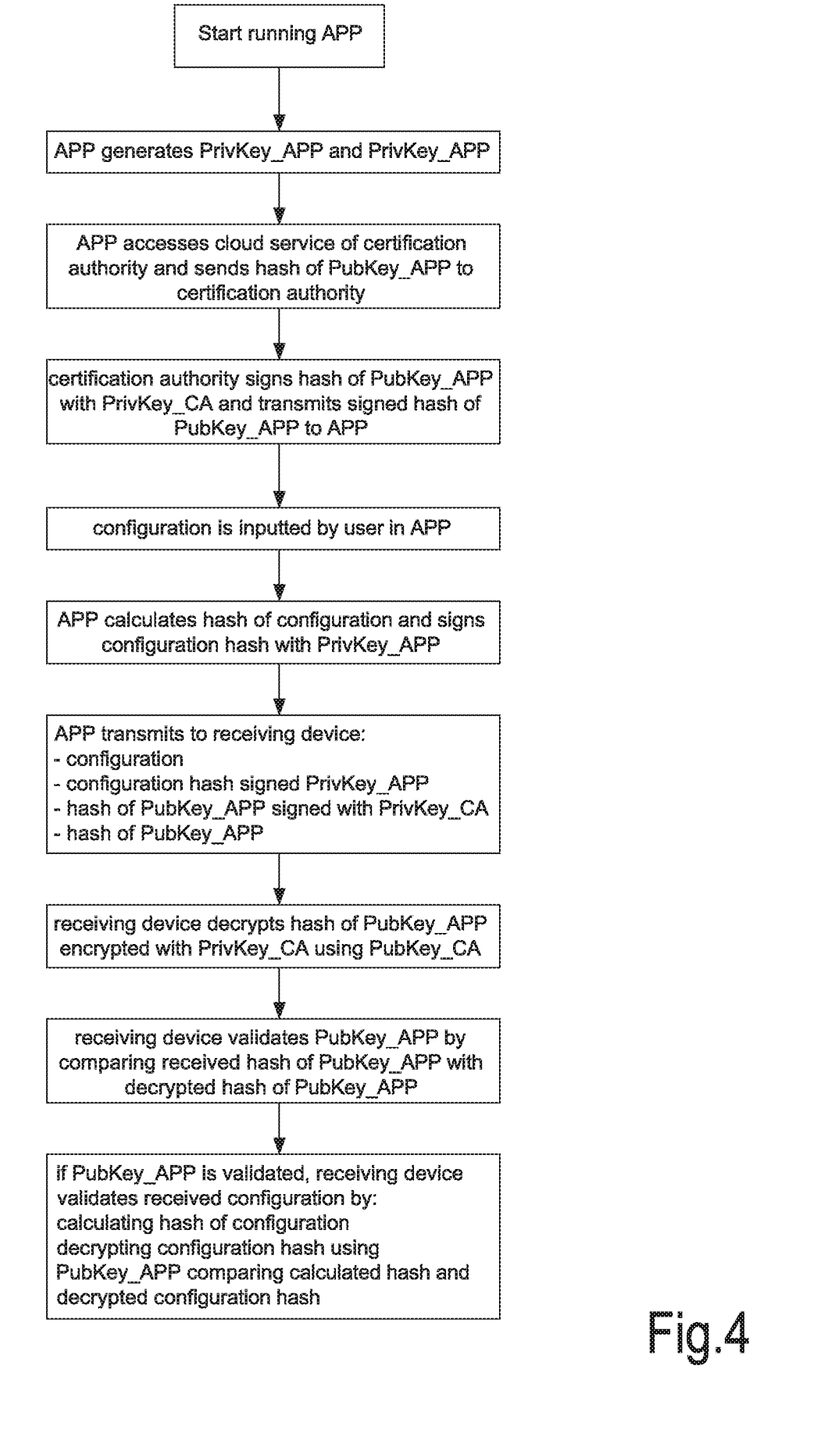
FIG. 4 illustrates a flowchart summarizing the validating procedure.
Figure 5:
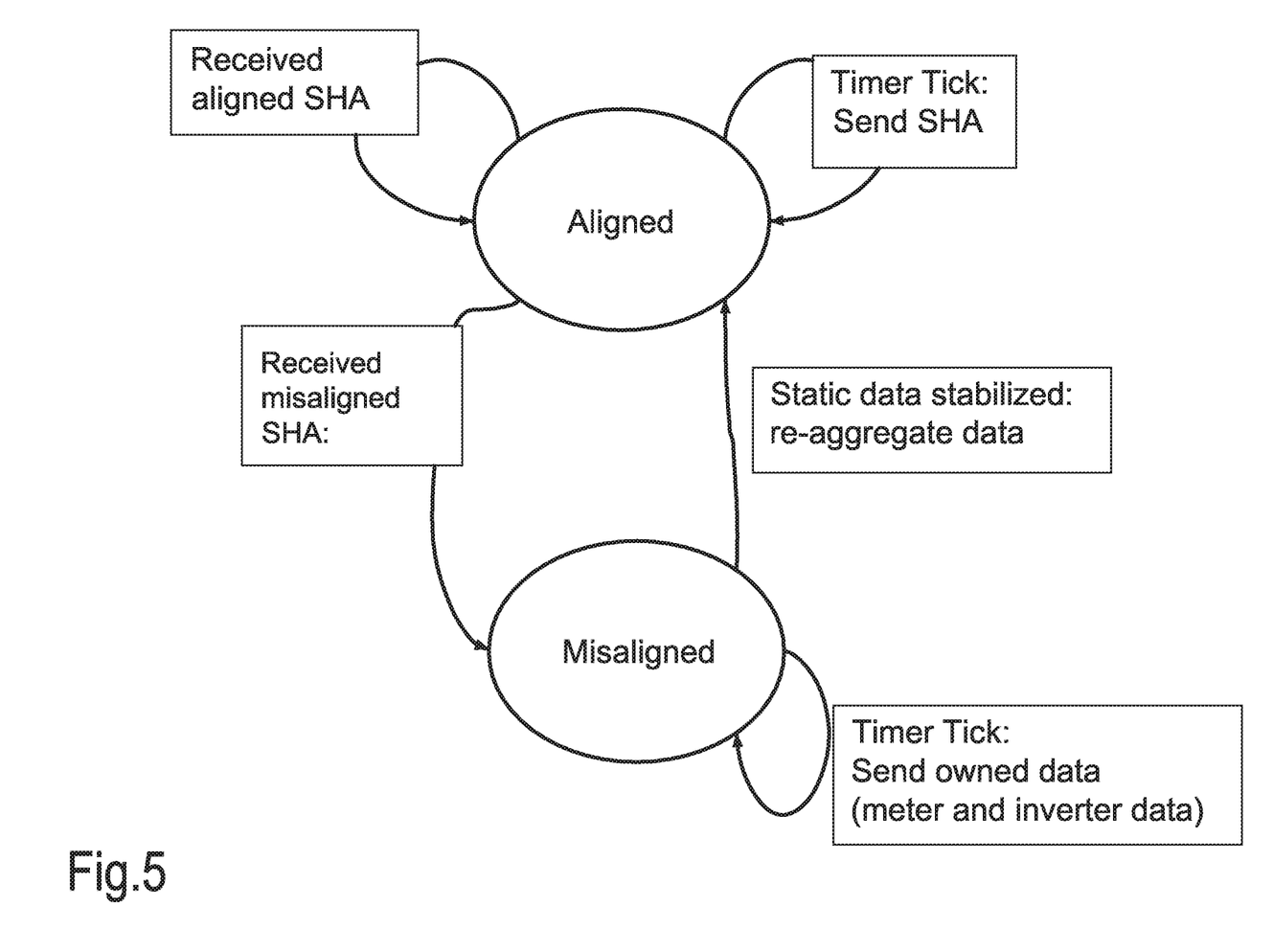
FIG. 5 illustrates a finite state machine supervising the re-alignment of quasi-static data among power generators of a cluster.
Figure 6:
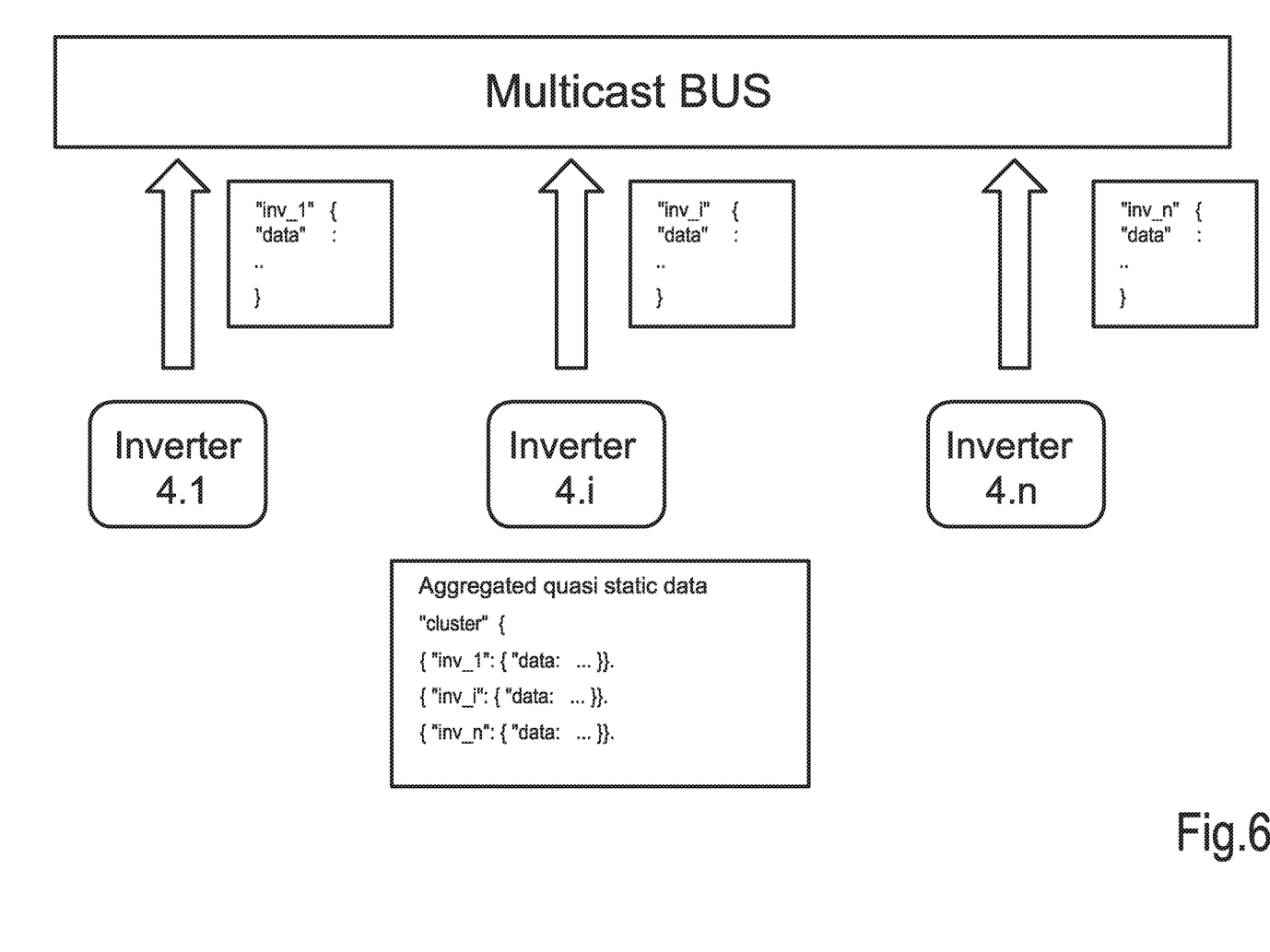
FIG. 6 illustrates a diagram of data re-aggregation for re-alignment of quasi-static data.

FIG. 4 illustrates the finite state machine supervising the above described process and FIG. 5 illustrates the multicast transmission of single inverter data by each misaligned inverter to the other inverters of the system, and re-aggregation of data at each inverter to re-construct the entire map of quasi-static data of the system 1.

Once the quasi-static data are synchronized, i.e., each inverter has stored the same quasi-static data set, said data are available from any one of the inverters 4.1, . . . 4.i, . . . 4.n of the system 1. They can for instance be downloaded from any one of the inverters.

As mentioned above, each controller 5.1, . . . 5.i, . . . 5.n of the several power generators 2.1, . . . 2.i, . . . 2.n shall have access to a data set defining the configuration of the whole energy generation system 1. The data set of the system configuration shall be loaded in all inverters before start-up and may require updating.

Loading the configuration may be critical from a cyber-security perspective. Thus, in some embodiments a cyber-secure procedure is envisaged, which prevents loading of unauthorized, or non-authentic configurations into the inverters of the cluster. Two cybersecurity issues are to be considered. The APP loading the configuration shall sign the configuration. The inverter receiving the configuration shall be able to check if the signature is authorized by a certification authority and to validate the configuration received.

The certification authority can be, or controlled by, the entity which manufactures or provides the inverters of the cluster. The certification authority can be accessed through a portal or a cloud service. For a better understanding of the procedure described here below, reference shall be made to the diagram of FIG. 3.

For the validation process, a public-key cryptography system is used. The certification authority uses a set of public key and private key for asymmetric cryptography. These keys will be hereon indicated as PublKey_CA and PrivKey_CA, respectively. The public key PublKey_CA of the certification authority is available to each inverter 4.i or other device, which shall be connected to the connectivity network 8 and which should receive the configuration of the system 1. For instance the PubKey_CA can be stored in a storage memory accessible by the control unit of the inverter when the relevant control software is loaded in the inverter.

The APP, which is used to load the configuration into the devices of the system 1, will have its own public/private key pair for asymmetric cryptography. This set of keys can be generate by the APP at its first run and stored in the secure storage of the device on which the APP runs. These keys will be indicated as PublKey_APP and PrivKey_APP, respectively.

In summary, the validation process performed by the device into which the configuration of the system 1 is first loaded performs a first validation step to check if the APP attempting to load the configuration is authorized by the certification authority. The second step is to validate the configuration itself.

The APP shall be authorized by the certification authority as a first step. If the latter is accessible through a cloud service, for instance, the APP will access the cloud service through the credentials of the APP itself. Once access to the certification authority has been granted, the APP will send its public key PubKey_APP to the certification authority, which will sign the PubKey_APP using the private key PrivKey_CA of the certification authority. The signed PubKey_APP, i.e. the PubKey_APP encrypted with PrivKey_1, is returned to the APP and stored in the device on which the APP is running Specifically, the hash of PubKey_APP is calculated first, and the hash of the PubKey_APP is signed by the certification authority using the private key PrivKey_CA of the certification authority.

The signed hash of the PubKey_APP will be used by the inverter into which the APP attempts to inject the configuration to check that the APP is authorized by the certification authority to load a configuration in the system.

Figure 3:
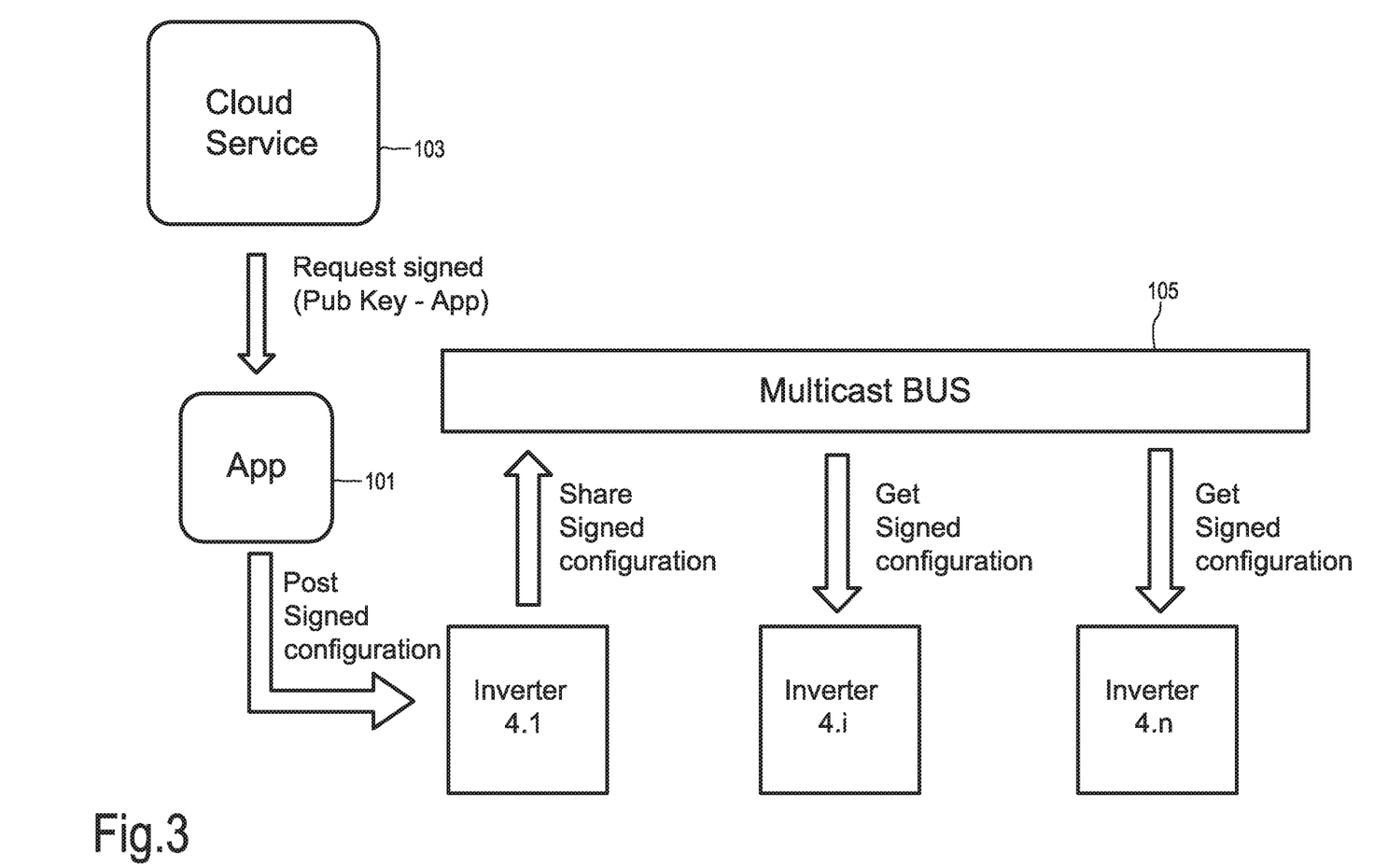
FIG. 3 illustrates a block diagram concerning a validation procedure for loading and validating a configuration into the cluster.

Referring now to the diagram of FIG. 3, reference number 101 indicates the device, e.g. a smartphone or other portable device with internet connectivity, on which the APP runs. Reference number 103 schematically represents the cloud service of the certification authority. In the example of FIG. 3 the portable device is in data communication with the inverter 4.1. Thus, the configuration will be loaded in said inverter and subsequently distributed to the other inverters of the cluster by multicasting through the connectivity network 8.

The user will load the configuration of the system 1 in the device 101 using the APP. The configuration data may include, a timestamp of the configuration, the nominal power of the plant, set point as percentage of the plant nominal power, percentage of the plant nominal power as guard band for measurement errors, percentage of the plant nominal power as set point value for fail safe operations, deadline time for control applications, meter or meters to be used for exported power feedback measurements among all found meters, list of all inverters participating to the control action.

Once the configuration data have been loaded, the APP will sign the configuration as follows. It will calculate a digest, i.e. a hash, of the configuration data package and will encrypt the hash using the private key of the APP (PrivKey_APP).

The next step is to post the configuration. In the schematic diagram of FIG. 3 the APP loads the configuration into one of the inverters, by way of example inverter 4.1, hereon also referred to as the receiving device. The data loaded into the inverter are: the configuration, the hash of the configuration encrypted with PrivKey_APP. The APP will calculate also the hash of its own public key PubKey_APP and transmits the hash of the PubKey_APP as well as the signed version thereof, encrypted with PrivKey_CA, previously received from the certification authority 103. This data set is aimed at allowing the receiving device (inverter 4.1 in the described example) to perform two tasks, namely: to check if the transmitting APP is authorized to communicate with the receiving device, which is done by validating the public key PubKey_APP; and, secondly, to validate the received configuration.

The validation process executed by the receiving device 4.1 is as follows. The PubKey_CA is available to the receiving device, for instance is stored in a storage memory accessible by the controller of the receiving device. The receiving device is thus able to decrypt the signed (encrypted) hash of PubKey_APP, which has been signed with PrivKey_CA. If the decrypted hash of PubKey_APP is identical with the hash of PubKey_APP transmitted by the APP to the receiving device, the key is validated and the receiving device acknowledges that the APP transmitting the configuration is certified by the certification authority.

If this first validation step is unsuccessful, the configuration is not loaded in the receiving device.

If the validation step is successfully concluded, the receiving device must validate the configuration itself, e.g., to check that it has not been altered. This is done by decrypting the hash of the configuration, which has been encrypted by the APP with PrivKey_APP, using the PubKey_APP, which the APP has made available to the receiving device. The receiving device has also received the configuration itself; thus it will calculate the hash of the received configuration. If the calculated hash and the decrypted hash are identical to one another, the configuration is validated.

The receiving device 4.1 is now able to share the received data (configuration and encrypted hash of the configuration) on a multicast bus 105 (see FIG. 3), forming part of the connectivity network 8, such that each device connected to the network 8 can receive the same data and validate the configuration by repeating the above described process.

The above described validation procedure is summarized in the flowchart of FIG. 4.

At the end of the above described procedure, each receiving device, i.e., for instance each control unit of the inverters 4.i, will have a validated configuration of the system loaded therein.

While the invention has been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

What is claimed is:

1. A method for managing an energy generation system, including a cluster of power generators connected by a connectivity network, each power generator including an inverter having a respective controller, and at least a data set available to the controller for controlling the respective power generator; wherein:
   the current data set includes at least one of: a configuration of the energy generation system; and a map of quasi-static data of the energy generation system;
   each inverter transmits through said connectivity network, to the other inverters of the cluster, information concerning said data set available to it, said information being sufficient to check whether the data sets available to each inverter are identical to one another, said information comprising a respective time stamp;
   each inverter receives, through said connectivity network, information concerning the data set available to other inverters of the cluster, said information comprising a respective time stamp;
   each inverter checks if the current data set available to it and the data sets received from the other inverters are identical to one another;
   if the data sets are identical to one another, the inverter remains in an aligned state;
   if the data sets are not identical to one another, the inverter shifts in a misaligned state and sends, through the connectivity network, the current data set available to it to the other inverters, the transmitted data set comprising a respective time stamp;
   each inverter in a misaligned state stores as the current data set available to it the data set having a most recent time stamp among: the current data set available to it, and the data sets received from the other inverters; and
   each inverter in the misaligned state returns in the aligned state when the current data set available to it becomes stable.

2. The method of claim 1, wherein said information includes a digest of at least a portion of the data set.

3. The method of claim 1, wherein:
   said information includes a digest of the data set; and
   each inverter in the aligned state performs the following steps:
      calculates a first digest of the data set thereof and sends said first digest through the connectivity network to the other inverters of the cluster;
      receives through said connectivity network a second digest of the data set of at least another inverter of the cluster;
      checks if the first digest and the second are identical;
      if the first digest and the second digest are identical the inverter remains in the aligned state; and
      if the first digest and the second digest are different from one another, the inverter shifts in the misaligned state.

4. The method of claim 3, wherein each inverter in the misaligned state performs the following steps:
   (a) shares with the other inverters of the cluster the first data set and the digest thereof, the first data set having a time stamp;
   (b) when a second data set with a time stamp is received by the inverter in the misaligned state, the inverter checks which of the first data set and second data set has the most recent time stamp and elects said data set with the most recent time stamp as the data set of the inverter; and
   repeats steps (a) and (b) until the first data set and the second data set are identical to one another.

5. The method of claim 3, wherein each inverter in the misaligned state performs the following steps:
   shares with the other inverters of the cluster a first sub-set of said first data set;
   receives sub-sets of the data sets of the other inverters of the cluster and re-aggregates a full data set by combining the sub-sets;
   shifts to the aligned state when the re-aggregated data set is stabilized.

6. The method of claim 1, further comprising preliminary steps of:
   loading a configuration of the system in one of said inverters; and
   propagating the configuration from said one of said inverters to the other inverters of the system through the connectivity network.

7. The method of claim 6, further comprising the following step:
   the inverter receiving the configuration validates the configuration.

8. An energy generation system comprising:
   a cluster of power generators connected by a connectivity network, each power generator including an inverter having a respective controller, and at least a current data set available to the controller for controlling the respective power generator;

wherein the current data set includes at least one of: a configuration of the energy generation system; and a map of quasi-static data of the energy generation system;

wherein for each power generator the respective controller is configured such that:

each inverter transmits through said connectivity network, to the other inverters of the cluster, information concerning said current data set available to it, said information being sufficient to check whether the data sets available to each inverter are identical to one another, said information comprising a time stamp;

each inverter receives, through said connectivity network, information concerning the current data set available to other inverters of the cluster, said information comprising a time stamp;

each inverter checks if the current data set available to it and the data sets received from the other inverters are identical to one another;

if the data sets are identical to one another, the inverter remains in an aligned state;

if the data sets are not identical to one another, the inverter shifts in a misaligned state and sends, through the connectivity network, the current data set available to it to the other inverters, the transmitted data set comprising a time stamp;

each inverter in a misaligned state stores as the current data set available to it the data set having the most recent time stamp among the current data set available to it and the data sets received from the other inverters; and each inverter in the misaligned state returns in the aligned state when the current data set available to it becomes stable.

9. The energy generation system of claim 8, wherein said information includes a digest of at least a portion of the data set.

10. The energy generation system of claim 8, wherein:
said information includes a digest of the data set; and
for each power generator the respective controller is configured such that each inverter in the aligned state:
calculates a first digest of the data set thereof and sends said first digest through the connectivity network to the other inverters of the cluster;
receives through said connectivity network a second digest of the data set of at least another inverter of the cluster;
checks if the first digest and the second digest are identical;
if the first digest and the second digest are identical the inverter remains in the aligned state; and
if the first digest and the second digest are different from one another, the inverter shifts in the misaligned state.

11. The energy generation system of claim 10, wherein for each power generator the respective controller is configured such that each inverter in the misaligned state:
(a) shares with the other inverters of the cluster the first data set and the digest thereof, the first data set having a time stamp;
(b) when a second data set with a time stamp is received by the inverter in the misaligned state, the inverter checks which of the first data set and second data set has the most recent time stamp and elects said data set with the most recent time stamp as the current data set of the inverter; and
repeats (a) and (b) until the first data set and the second data set are identical to one another.

12. The energy generation system of claim 10, wherein for each power generator the respective controller is configured such that each inverter in the misaligned state:
shares with the other inverters of the cluster a first sub-set of said first data set;
receives sub-sets of the data sets of the other inverters of the cluster and re-aggregates a full data set by combining the sub-sets;
shifts to the aligned state when the re-aggregated data set is stabilized.

13. The energy generation system of claim 8, wherein at least one controller is configured to:
load a configuration of the system in an associated one of said inverters; and
propagate the configuration from said one of said inverters to the other inverters of the system through the connectivity network.

14. The energy generation system of claim 13, wherein the controller associated with the inverter receiving the configuration is configured to validate the configuration.

* * * * *